United States Patent [19]

Netzel et al.

[11] Patent Number: 4,487,660
[45] Date of Patent: Dec. 11, 1984

[54] MULTIPLE WALL STRUCTURE FOR FLEXIBLE CABLE USING TUBULAR AND SPIRAL CORRUGATIONS

[75] Inventors: Philip C. Netzel, Milmont Park; Edward M. Spencer, Chalfont, both of Pa.

[73] Assignee: Electric Power Research Institute, Palo Alto, Calif.

[21] Appl. No.: 202,452

[22] Filed: Oct. 31, 1980

[51] Int. Cl.³ .............................................. H01B 9/06
[52] U.S. Cl. ...................................... 174/28; 138/114; 138/122; 174/14 R; 174/21 C; 174/126 CS
[58] Field of Search ............. 174/13, 14 R, 15 C, 174/16 B, 21 C, 24, 27, 28, 29, 99 R, 99 B, 99 E, 102 D, 105 R, 106 R, 106 D, 126 CS, 128 R, 130, 131 R; 138/111–114, 121, 122, 173

[56] References Cited

U.S. PATENT DOCUMENTS

| 3,340,353 | 9/1967 | Mildner ................... 174/105 R X |
| 3,717,718 | 2/1973 | Schmidtchen ............. 174/106 D |
| 3,789,129 | 1/1974 | Ditscheid ................. 174/102 D X |
| 3,866,670 | 2/1975 | Cramer et al. ........... 138/111 X |
| 4,095,041 | 6/1978 | Netzel et al. ............. 174/28 |
| 4,100,367 | 7/1978 | Netzel ..................... 174/28 |
| 4,101,730 | 7/1978 | Netzel ..................... 174/21 C X |
| 4,122,298 | 10/1978 | Brandt ..................... 174/28 |
| 4,262,162 | 4/1981 | Plinke et al. ............. 174/15 C |
| 4,263,476 | 4/1981 | Netzel ..................... 174/28 X |

FOREIGN PATENT DOCUMENTS

| 2830984 | 1/1980 | Fed. Rep. of Germany . |
| 1119565 | 7/1968 | United Kingdom ........... 174/15 C |
| 1200808 | 8/1970 | United Kingdom ........... 174/28 |
| 1315615 | 5/1973 | United Kingdom ........... 174/106 D |
| 1390280 | 4/1975 | United Kingdom ........... 174/106 D |
| 2027554 | 2/1980 | United Kingdom ........... 174/28 |

Primary Examiner—Laramie E. Askin
Attorney, Agent, or Firm—Ostrolenk, Faber, Gerb & Soffen

[57] ABSTRACT

The central conductor of a gas-insulated flexible cable consists of separate concentric tubes which are alternately spirally corrugated and annularly corrugated so that the corrugations will not nest relative to one another and are axially movable relative to one another.

12 Claims, 7 Drawing Figures

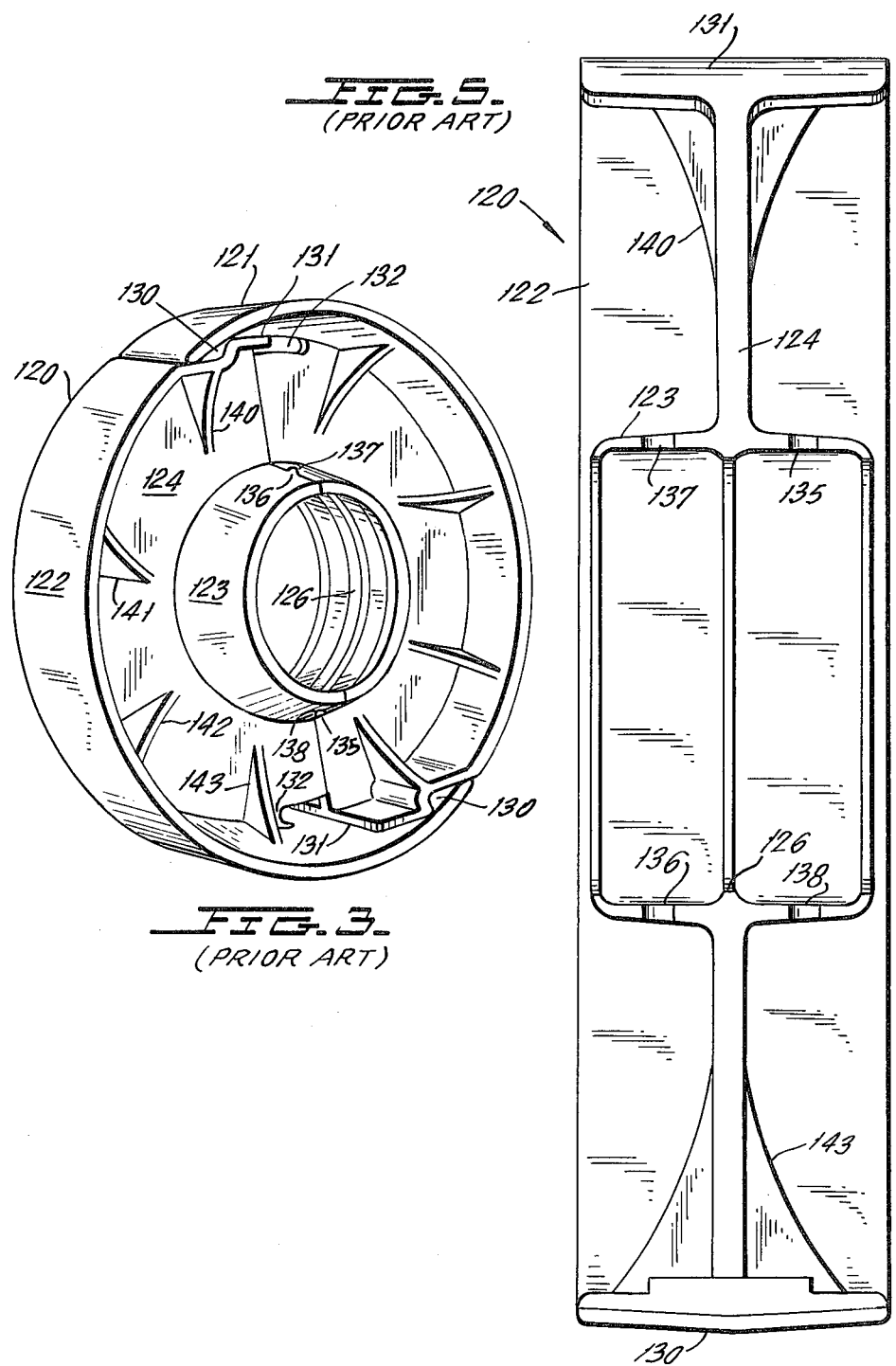

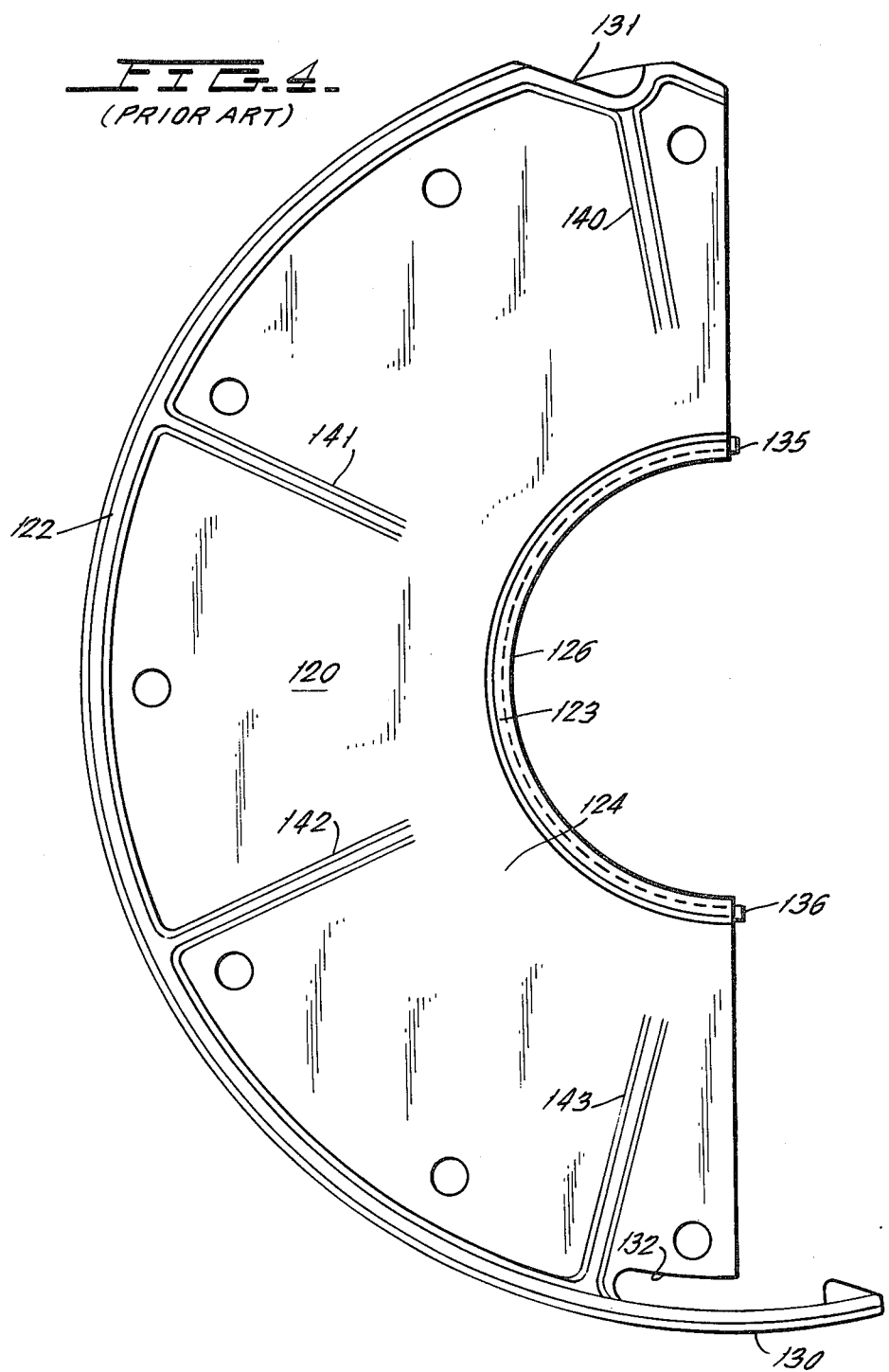

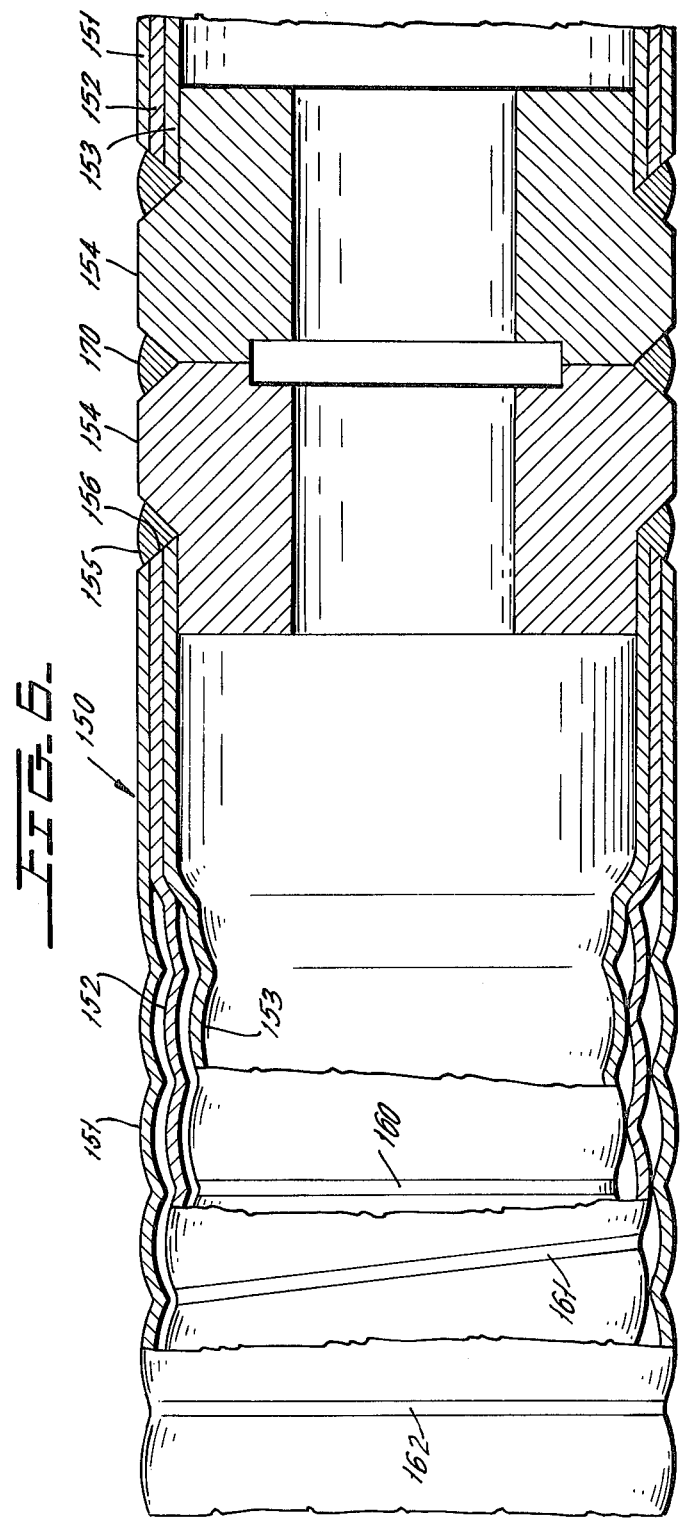

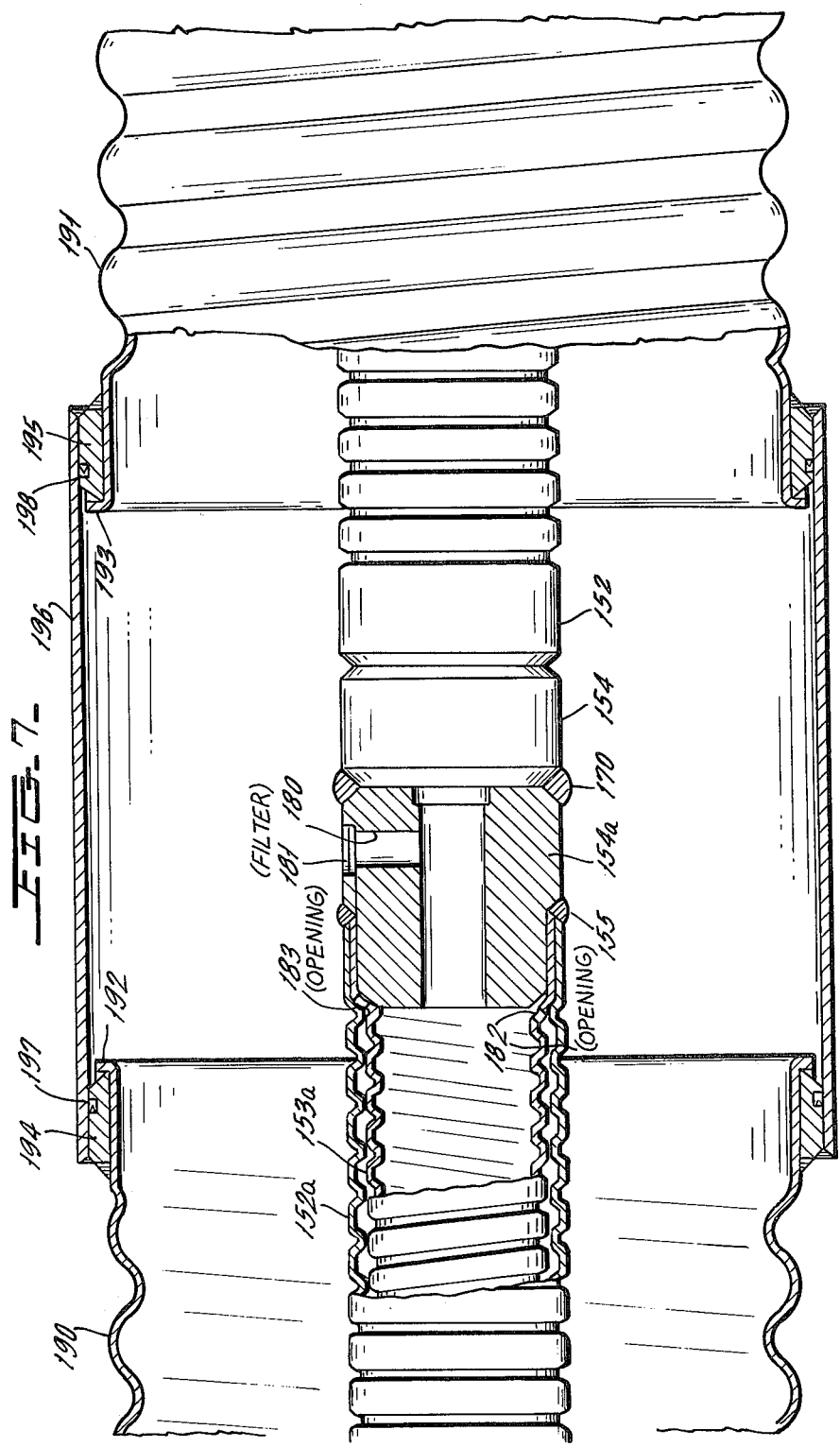

MULTIPLE WALL STRUCTURE FOR FLEXIBLE CABLE USING TUBULAR AND SPIRAL CORRUGATIONS

RELATED APPLICATIONS

This application is related to copending application Ser. No. 82,130, filed Oct. 5, 1979, in the name Philip C. Netzel, entitled INSULATION SPACER FOR GAS-INSULATED TRANSMISSION LINE WITH IMPROVED OUTER RIM STRUCTURE, assigned to the assignee of the present invention now U.S. Pat. No. 4,263,476.

BACKGROUND OF THE INVENTION

This invention relates to flexible high voltage gas-insulated cable for electric power distribution purposes, and more specifically relates to a novel construction for the central conductor of such cable to ensure improved flexibility and high current carrying capability.

High voltage gas-insulated cable is well known in the art wherein cable for carrying high voltages, typically 230,000 volts and above, is provided with a central conductor spaced within a concentric outer grounded housing by spaced insulator supports. A suitable electronegative gas, typically sulfur hexafluoride under positive pressure, fills the interior of the outer housing. Cables of this type are disclosed in U.S. Pat. No. 4,100,367, in the name of Netzel; U.S. Pat. No. 4,095,041, in the name of Netzel and Ponder; U.S. Pat. No. 4,101,730 in the name of Netzel; U.S. Pat. No. 4,122,298 in the name of Brandt.

The outer housing of the cable is conventionally corrugated with annular or spiral corrugations to improve the flexibility of the outer housing and to permit the cable, though of relatively large diameter, to be wound on reels capable of shipment on trucks or railroad cars.

The central conductor is also relatively flexible to permit the reeling of the cable and consists typically of a thin wall, corrugated copper core which receives elongated segmented stranded aluminum wire fillers contained on the outer diameter of the corrugated core by a thin walled, corrugated copper sheath. This structure is disclosed in U.S. Pat. No. 4,122,298 to Brandt and in U.S. Pat. No. 4,095,041 to Netzel and Ponder.

The structure of the central conductor using segmented stranded aluminum wire fillers is expensive and difficult to manufacture since specialized machinery is needed to make the segmented stranded filler. Moreover, it was found that the a-c to d-c resistance ratio as measured by thermal tests was about 1.6 to 1, which is relatively high.

BRIEF DESCRIPTION OF THE PRESENT INVENTION

In accordance with the present invention, two or more concentric corrugated conductors having a total cross-sectional area which is sufficient to carry the rated current of the cable are provided for the central conductor. The two or more concentric sheaths are as close together as possible in their radial spacing but, to permit independent flexing of the individual corrugated sheaths, they are corrugated in a manner that they will not nest relative to one another. Thus, in a typical example of the invention, three concentric tubes are used which axially slide relative to one another. The inner and outer tubes of the three tubes have spiral corrugations, while the central tube has an annular corrugation pattern. Consequently, the three tubes cannot lock relative to one another and they are free to slide relative to one another when the cable bends. In this way, the central conductor is relatively flexible and has a sufficient cross-sectional area for carrying the rated current of the cable. While any number of concentric sheaths can be used, the number should be fairly limited since, as the number of tubes increases, there will be less and less current carried by the innermost tubes.

Since the individual tubes are corrugated singly during the manufacturing process, the corrugation task is simpler than for a single tube with a large enough wall thickness to give the current capacity of the multiple tubes of the invention. Moreover, larger total effective cross-sectional areas for conduction of current are now available which could not be obtained in the past in a single corrugated tube because of the limitations of the corrugation equipment.

The a-c to d-c resistance ratio obtained for the relatively thin walled plural tubes with relatively large diameter will be 1.1 to 1 or lower. This is within the value needed to give good performance for the cable.

BRIEF DESCRIPTION OF THE DRAWINGS

FIG. 3 is a perspective view of a prior art type of support insulator which can be used in place of the support insulator of FIGS. 1 and 2.

FIG. 4 is a front elevation view of one insulator half constructed in the manner shown in FIG. 3.

FIG. 5 is an elevation view of the diametrical edge of the insulator half of FIG. 4.

FIG. 6 is a view partially in section through the axis of a central tubular conductor along with a termination made in accordance with the present invention.

FIG. 7 is a cross-sectional view through a flexible cable, including a terminal thereof using a second embodiment of the invention.

DETAILED DESCRIPTION OF THE DRAWINGS

Figure 1:
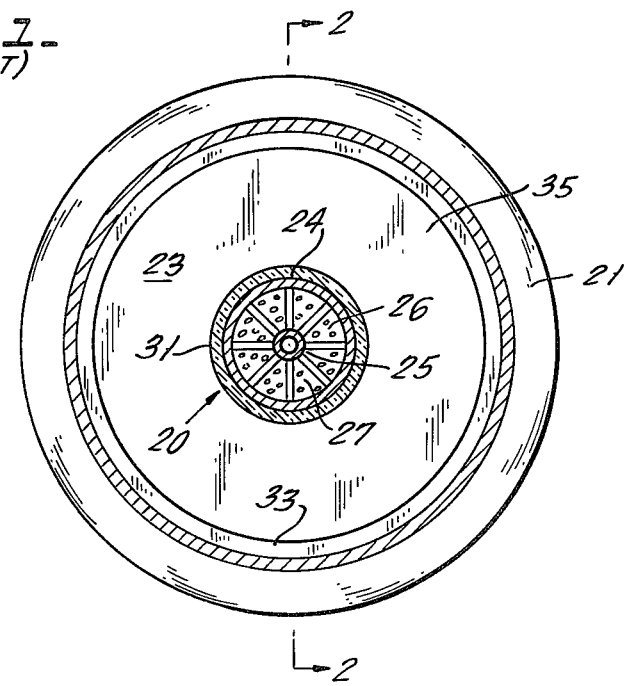
FIG. 1 is a cross-sectional view of a prior art type high voltage flexible cable and is a cross-sectional view of FIG. 2 taken across section line 1—1 in FIG. 2.
Figure 2:
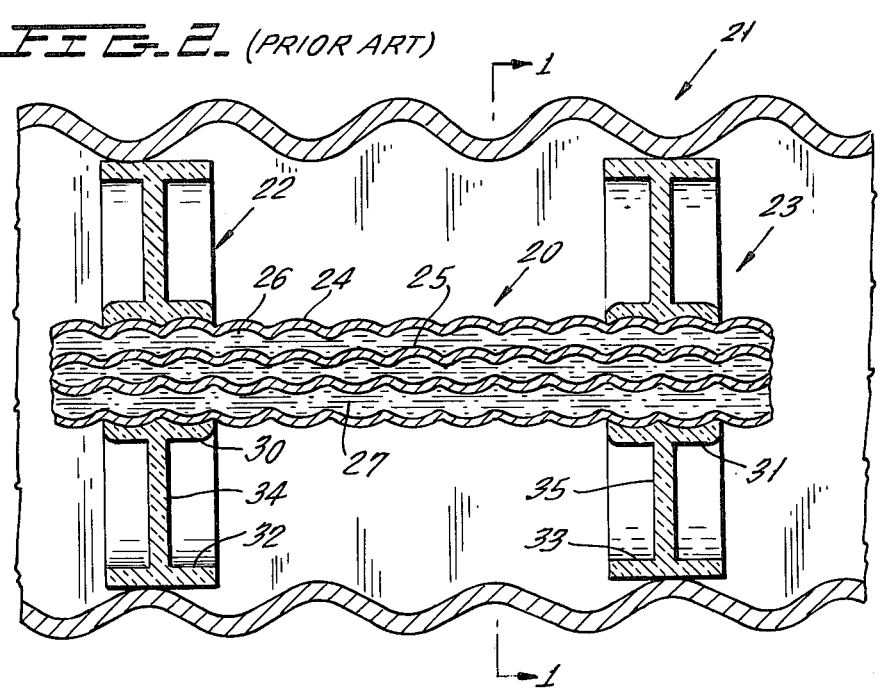
FIG. 2 is a cross-sectional view of FIG. 1 taken across the section line 2—2 in FIG. 1.

Referring first to FIGS. 1 and 2, there is shown a section of typical prior art flexible gas-insulated transmission line for conducting electric power at low frequency, for example, 60 Hz., and at high voltage, for example, 230,000 volts. The transmission line consists of a central flexible conductor 20, an outer flexible grounded housing 21, and spaced support insulators 22 and 23 which support conductor 20 within housing 21.

The central conductor 20 consists of concentric corrugated copper tubes 24 and 25 which support segmented groups of aluminum strands between them, including typical groups 26 and 27. The effective cross-sectional area of central conductor 20 is 3600 square millimeters. Tube 24 has an outer diameter of about 100 millimeters.

Outer conductor 21 consists of a corrugated aluminum tube having an outer diameter of about 300 millimeters. Conductor 21 is formed by wrapping sheet material around insulators 22 and 23 assembled on conductor 20, and is then welded with a longitudinal weld seam. The tube is then corrugated with corrugations which are parallel to one another and perpendicular to the axis of tube 21, or with corrugations which are threaded around the axis of tube 21. The corrugations may have a depth of about one inch, and a crest-to-crest spacing of about two inches.

The support insulators 22 and 23 are only schematically shown in FIGS. 1 and 2 and each consists of inner and outer rims 30, 31 and 32, 33, respectively, joined by thin transverse webs 34 and 35, respectively.

The interior of housing 21 is filled with clean sulfur hexafluoride at a pressure of about 45 p.s.i.g. at room temperature, and the assembly is provided with terminals at either end and is sealed.

The assembly of FIGS. 1 and 2 can have any desired length to the limit of reel capacity and may be reeled on a 3.7 meter diameter reel for shipment to an installation site.

The structure of the support insulator 22 or 23, shown in FIGS. 1 and 2, is preferably that described in U.S. Pat. No. 4,263,476. This structure is shown in detail in FIGS. 3, 4 and 5. Thus, the insulator of FIGS. 3, 4 and 5 is formed of two halves which are latched together and made of any suitable plastic material by an injection-molding process.

The insulators of FIGS. 3, 4 and 5 allow the cable to be used in high voltage transmission systems at high voltages such as 345,000 volts, where the insulator outer diameter typically may be 336 millimeters and support a central conductor having an outer diameter which is typically 120 millimeters. These insulators, when used with an appropriately flexible outer sheath and inner conductor, permit the bending of the entire cable to a radius having a ratio of reel diameter to cable diameter of about 9 to 1.

The insulator structure generally consists of the two halves 120 and 121. Openings permit passage of gas through the interior of the housing of the complete cable. Halves 120 and 121 are identical.

Each of the halves is molded from a suitable plastic and is molded as a unitary part. They each contain an outer rim 122, an inner rim 123 and a central connecting web 124. The outer rim 122 has a generally symmetrically tapered configuration. The inner rim 123 is also shaped for maximum dielectric efficiency and contains a central projection 126 which is shaped to enter the cooperating corrugation of the outermost of the central conductors to be supported by the insulator. The corrugation shown in FIGS. 3, 4 and 5 is for the case of an annularly corrugated outer conductor which is the case of the conductor of the present invention as will be later seen in connection with FIG. 6.

The central web 124 is preferably as thin as possible to present as small as possible a cross-section to the high electric field which will exist between a conductor on the interior of the rim 123 and the grounded conductive housing surrounding the exterior of rim 122.

In order to join together the two halves 120 and 121 as shown in FIG. 3, each of the halves is provided with integral cooperating latch members shown as the projecting latch 130 and a respective latch keeper region 131. During assembly, the latch 130 of one half will snap into the latch keeper 131 of the other half as is well known and as will be apparent in FIG. 3. Note that the latch 130 is made relatively flexible by cutting a notch 132 into the web 124 adjacent the latch 130. The keeper 131, however, is rigid.

Each of the halves 120 and 121 is further provided with keying projections and notches which cooperate with one another to hold the halves in the same axial position relative to one another after they are assembled. Thus, the half 120 in FIGS. 4 and 5 is provided with key projections 135 and 136 and key depressions 137 and 138 (FIGS. 3 and 5) which automatically align the two halves during their assembly.

Each insulator half is provided with four ribs 140 to 143 which are shaped to taper outwardly from the central web beginning at a point about ⅓ of the radial distance along the web from the central rim 123. The ribs then taper or flare outwardly to join the outer rim 122. The outward flare is a relatively gentle flare and, for example, is on a radius of about 113 millimeters.

Each of the reinforcing ribs 140 and 143 is located immediately adjacent the keeper 131 and just behind the latch 130, respectively. This placement of the ribs prevents breakage at these points, which is a frequent point of failure in insulators of other types.

In accordance with the invention, the central conductor 20 of FIGS. 1 and 2 is replaced by a central conductor 150 having the structure shown in FIG. 6, where this central conductor may be supported within the outer housing 21 of FIGS. 1 and 2 by support insulators of the type shown in FIGS. 3, 4 and 5. The central conductor 150 is shown in FIG. 6 as consisting of three concentric copper tubes 151, 152 and 153 which are as radially close to one another as possible. The terminal ends of concentric conductors 151, 152 and 153 are uncorrugated cylinders which are radially fixed to one another and are welded to a conductive end ring 154 at the weld bead 155 which flows over the tapered end surface 156 of the concentric tubes 151 to 153.

The innermost tube 153 is annularly corrugated. That is to say, the minimum diameter regions of the corrugations, such as minimum diameter region 160, is perpendicular to the axis of the cable. Note that the corrugation of the tube 153 may be such that minimum diameter regions are reached every 1 inch along the axis of the tube.

The central tube 152 is also corrugated but has a spiral corrugation 161. The pitch of spiral corrugation 161 may also be about 1⅛ inches. The outermost sheath 151 will have its minimum diameter corrugation regions 162 also spaced at about 1¼ inches from one another. The length of tubes 151, 152 and 153 may be any desired length depending upon the length of the cable being made.

In order to join together discrete lengths of the central conductor, each conductor can be terminated at its ends by the heavy rings 154. To connect one section to another, it only becomes necessary to weld together the two rings 154 of the two sections, as shown by the weld bead 170 in FIG. 6.

In the embodiment of FIG. 6, the individual tubes 151, 152 and 153 may have a thickness of about 2.5 millimeters. They can be corrugated in a single path through a conventional corrugating machine. By having the corrugations of diverse types, as shown in FIG. 6, one tube will not nest into an adjacent tube so that the tubes can move relative to one another in an axial direction when the cable is bent as it will be during reeling or during installation. Also, by allowing the tubes to move in this manner, relative to one another, the assembly will be more flexible than if the tubes are locked together by the corrugations.

Alternative corrugation patterns could be used. For example, the central conductor 153 could be spirally corrugated with the thread direction opposite to that of the thread of the corrugation of member 152. Other diverse patterns will be apparent to prevent the nesting or interlocking of adjacent tubes while keeping the tubes relatively flexible.

FIG. 7 shows a further embodiment of the novel central conductor of the present invention located relative to an outer housing. Thus, in FIG. 7, two end sections of cables are shown which contain only two conductors 152a and 153a, which have annular and spiral corrugations respectively in their central conductor. The third concentric conductor 151 of FIG. 6 is eliminated from the embodiment of FIG. 7. The material of the conductors 152a and 153a can be aluminum, copper or any other conductive material. Good results have been obtained with an aluminum alloy 1100 which is a relatively soft aluminum which bends easily during bending of the cable.

The two cable sections shown in FIG. 7 are each attached to a respective heavy end ring 154a as in the case of FIG. 6, but the end rings 154a in FIG. 7 have a slightly different configuration than that of FIG. 6. The end rings 154a of FIG. 7, however, serve the same purpose as described in connection with FIG. 6. In FIG. 7, end ring 154a, shown in cross-section, is provided with an aperture 180 which may contain a filter 181 which permits the circulation of sulfur hexafluoride gas into the center of the central conductor during filling of the cable. Similarly, the central sheath 153a can have several openings such as the openings 182 and 183 to enable the loading of sulfur hexafluoride gas between the two sheaths 152a and 153a.

The two flexible conductor sections shown in FIG. 7 are provided with respective corrugated outer housings 190 and 191, respectively, which terminate in flanges 192 and 193, respectively. Welding rings 194 and 195 are welded to the uncorrugated ends of corrugated housings 190 and 191 as shown. A cover 196 is then welded between the rings 194 and 195 after assembly of the central conductors is completed. Sealing rings 197 and 198 can be provided to ensure against leakage of gas from the interior of the housing.

The novel construction shown in FIG. 7 discloses two conductor sheaths 152a and 153a, which are relatively slidable with respect to one another, and also discloses a novel means for connecting the shipping lengths of the flexible gas-insulated cable after the cable lengths have been installed.

Thus, the ends of each shipping section are processed in the factory such that the reinforcing rings 194 and 195 are placed far back on the enclosures 190 and 191. An end finishing tool is used to trim, flatten and flange the enclosure ends to produce the flanges 192 and 193. The rings 194 and 195 are then welded to the enclosure flange. The central conductor is treated similarly. Thus, the end of the central conductor is trimmed, flattened and tapered for welding.

The series of holes including holes 182 and 183 are then drilled through the inner tube 153a to allow for evacuation of space between the tubes and the eventual filling of that space with the sulfur hexafluoride gas. The machined ends 154a are then welded to the end of the conductors, as shown, to enable their connection. The filter 181, covering opening 180, enables the evacuation and filling of the center space of the conductor 153a. This opening is of importance to permit removal of moist air from the interior of the conductor to prevent possible deterioration of the SF$_6$ insulating gas after the cable is placed in service.

After the cables are manufactured and placed on a reel, gas-tight shipping covers are affixed to the cable ends and the cable is evacuated and filled with dry nitrogen or SF$_6$ gas at low pressure, for example, 5 p.s.i.g. for shipment. In the field, the shipping covers are removed, the enclosure cover 196 is slipped in place over the end of one of the adjacent cables and the central conductors are aligned and welded in place by a circumferential butt weld 170. The enclosure 196 is then drawn back to cover the cable ends and is welded in place as shown.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A flexible gas-insulated electrical cable; said gas-insulated cable comprising an elongated flexible tubular outer electrically conductive housing; an elongated flexible central electrical conductor extending coextensively with and insulated from said outer housing; a plurality of insulator support devices spaced along the axis of said cable and connected to and supporting said central conductor along the axis of said flexible cable and a dielectric gas under positive pressure filling the interior of said tubular outer housing; said central conductor comprising a plurality of concentric elongated flexible hollow electrically conductive tubes of approximately equal wall thickness in close radial relationship to one another; said tubes forming the major current carrying bodies of said cable; said plurality of tubes being independently slidable relative to one another, whereby said plurality of concentric elongated tubes are flexible independently of one another.

2. The cable of claim 1 wherein the diametrically outermost of said flexible hollow tubes is corrugated with annular corrugations which are perpendicular to the axis of said central conductor.

3. The cable of claim 2 wherein a second conductive tube of said plurality of tubes adjacent said outermost tube is corrugated with a spiral corrugation to prevent nesting of the corrugations of said outermost tube and said tube adjacent thereto.

4. The cable of claim 3 wherein a third conductive tube of said plurality of tubes is disposed immediately inwardly of and adjacent said second tube; said third conductive tube having annular corrugations therein.

5. The cable of claim 1, 2, 3 or 4 wherein each of said tubes has uncorrugated end portions defining concentric right cylinders which are secured together and a terminal member connected to the ends of each of said uncorrugated end portions.

6. A flexible electrical conductor comprising a plurality of concentric parallel connected elongated flexible hollow electrically conductive tubes in close radial relationship to one another and of approximately equal wall thickness; said plurality of tubes being independently slidable relative to one another, whereby said plurality of concentric elongated tubes are flexible independently of one another; the annular space between said tubes being gas filled.

7. The electrical conductor of claim 6 wherein the diametrically outermost of said flexible hollow tubes is corrugated with annular corrugations which are perpendicular to the axis of said conductor.

8. The electrical conductor of claim 7 wherein a second conductive tube of said plurality of tubes adjacent said outermost tube is corrugated with a spiral corrugation to prevent nesting of the corrugations of said outermost tube and said tube adjacent thereto.

9. The electrical conductor of claim 8 wherein a third conductive tube of said plurality of tubes is disposed immediately inwardly of and adjacent said second tube; said third conductive tube having annular corrugations therein.

10. The electrical conductor of claim 6, 7, 8 or 9 wherein each of said tubes has uncorrugated end portions defining concentric right cylinders which are secured together and a terminal member connected to the ends of each of said uncorrugated end portions.

11. In a high voltage transmission cable of a type including an elongated inner current conductor, a composite inner tubular current conductor comprising:
 a first corrugated tubular conductor; and
 a second corrugated tubular conductor positioned concentrically about said first tubular conductor, said second tubular conductor having corrugations that differ from those of said first tubular conductor in wave pitch, shape, depth or longitudinal separation, so as to permit longitudinal sliding movement between a plurality of engagements of various corrugation protrusions of one of said first and second tubular conductors with the immediately adjacent surface areas of the other of said first and second tubular conductors; whereby such permissible longitudinal sliding avoids internal longitudinal entanglements and anchoring between said tubular conductors upon differential longitudinal expansion of said first tubular conductor with respect to said second tubular conductor as a result of differences in high temperature operational conditions experienced by said tubular conductors, radial separation is maintained between said first and second tubular conductors as a result of said plurality of engagements, and high flexibility of the composite conductor is achieved notwithstanding a large aggregate current conducting cross-sectional area of said composite conductor.

12. A composite tubular current conductor in accordance with claim 11 comprising a third corrugated tubular conductor positioned concentrically about said second tubular conductor, said third tubular conductor having corrugations that differ from those of said second tubular conductor in wave pitch, shape, depth or position so as to permit longitudinal displacement between said second tubular conductor and said third tubular conductor while maintaining spatial radial separations between said second and third tubular conductors as a result of a plurality of engagements of various corrugation protrusions of one of said second and third tubular conductors with immediately adjacent surface areas of the other of said second and third tubular conductors.

* * * * *